United States Patent
Quach et al.

(10) Patent No.: US 11,536,145 B2
(45) Date of Patent: Dec. 27, 2022

(54) CERAMIC COMPONENT WITH SUPPORT STRUCTURE

(71) Applicant: Raytheon Technologies Corporation, Farmington, CT (US)

(72) Inventors: San Quach, Southington, CT (US); Alex J. Schneider, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/227,084

(22) Filed: Apr. 9, 2021

(65) Prior Publication Data
US 2022/0325630 A1    Oct. 13, 2022

(51) Int. Cl.
*F01D 5/14*     (2006.01)
*F01D 5/28*     (2006.01)
*F01D 9/02*     (2006.01)

(52) U.S. Cl.
CPC ............ *F01D 5/288* (2013.01); *F01D 5/284* (2013.01); *F01D 9/02* (2013.01); *F01D 5/147* (2013.01); *F05D 2230/90* (2013.01); *F05D 2240/12* (2013.01); *F05D 2300/6033* (2013.01)

(58) Field of Classification Search
CPC ... F01D 5/147; F01D 9/02; F01D 9/00; F01D 9/04; F01D 9/041; F01D 5/288
See application file for complete search history.

(56) References Cited

U.S. PATENT DOCUMENTS

| | | | |
|---|---|---|---|
| 7,097,673 B2 * | 8/2006 | Dudley | H01M 4/0404 429/185 |
| 7,452,189 B2 * | 11/2008 | Shi | F01D 5/147 416/241 B |
| 7,665,960 B2 | 2/2010 | Shi et al. | |
| 8,827,632 B1 * | 9/2014 | Lee | F01D 5/188 415/115 |
| 9,920,656 B2 | 3/2018 | Landwehr et al. | |
| 10,100,650 B2 * | 10/2018 | Mantkowski | C23C 4/00 |
| 10,767,495 B2 | 9/2020 | Whittle et al. | |
| 2020/0072066 A1 | 3/2020 | Thomas et al. | |
| 2020/0072070 A1 | 3/2020 | Blaney et al. | |
| 2020/0095877 A1 | 3/2020 | Koenig et al. | |
| 2020/0248568 A1 | 8/2020 | Whittle et al. | |
| 2020/0248569 A1 | 8/2020 | Whittle et al. | |

OTHER PUBLICATIONS

Extended European Search Report for European Patent Application No. 22166894.0 dated Aug. 19, 2022.

* cited by examiner

*Primary Examiner* — Michael L Sehn
(74) *Attorney, Agent, or Firm* — Carlson, Gaskey & Olds, P.C.

(57) ABSTRACT

An airfoil vane assembly according to an exemplary embodiment of this disclosure, among other possible things includes a vane piece having a first vane platform, a second vane platform, and a hollow airfoil section joining the first vane platform and the second vane platform, a spar piece having a spar platform and a spar extending from the spar platform into the hollow airfoil section, and at least one seal arranged at a sealing surface of the spar platform and sealing between the spar platform and the first vane platform. The airfoil vane assembly also includes a thermal barrier coating disposed on the spar piece. The sealing surface is free from the thermal barrier coating. A gas turbine engine and a method of making a spar piece for an airfoil vane assembly are also disclosed.

20 Claims, 3 Drawing Sheets

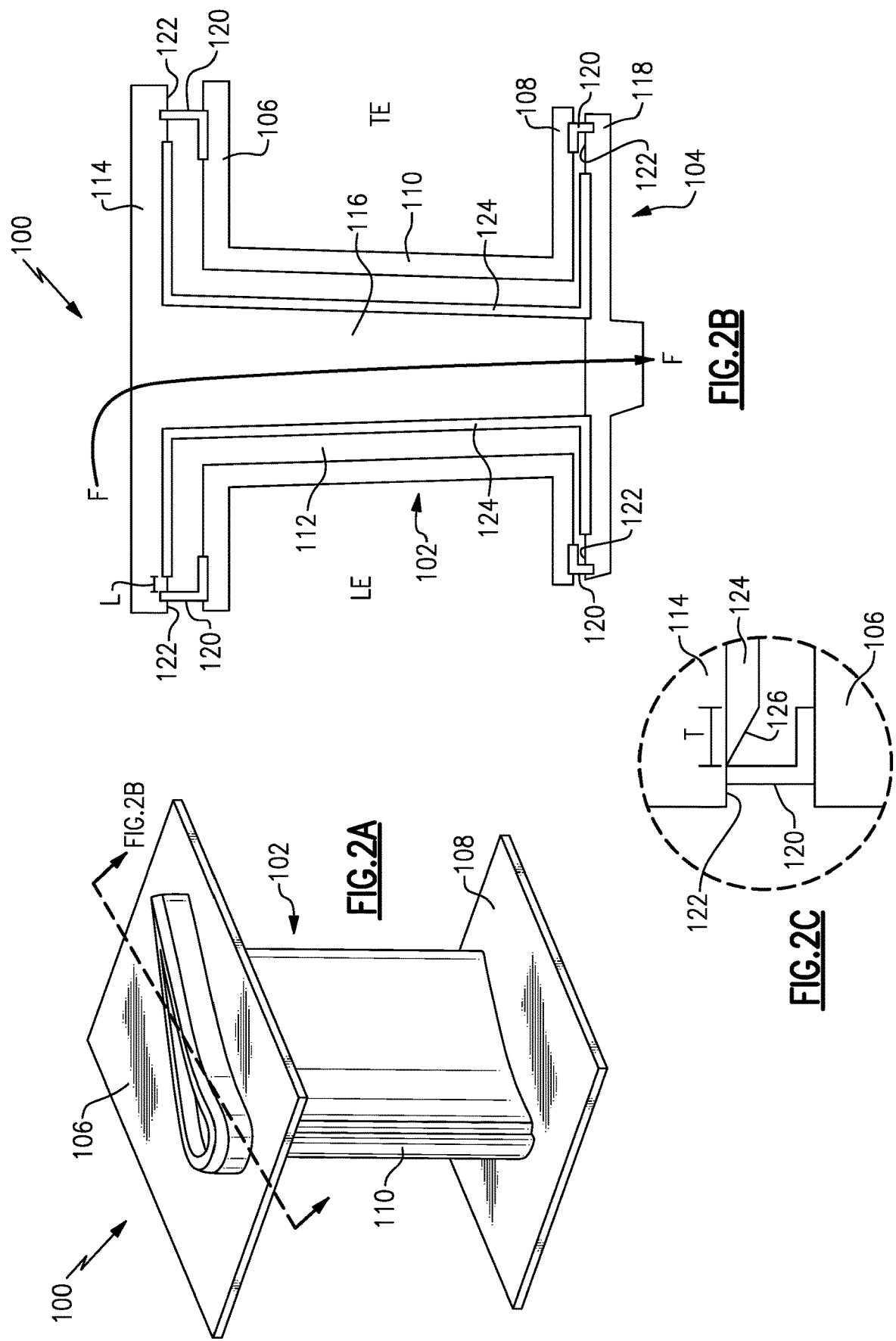

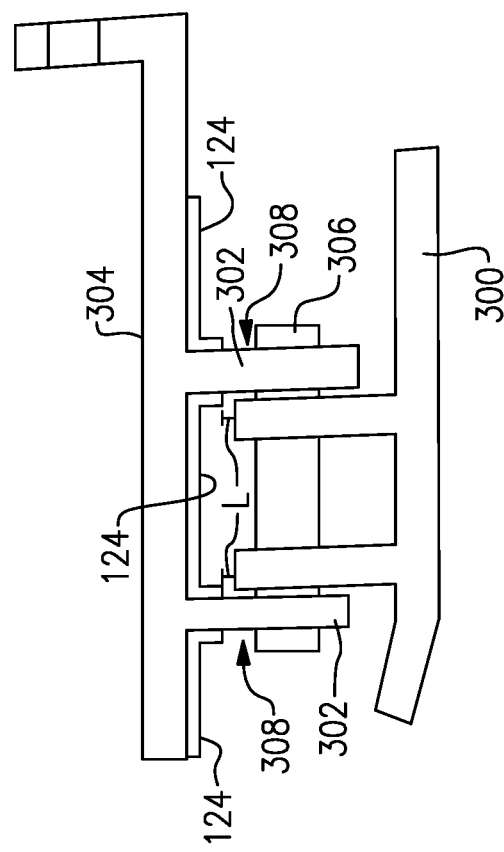
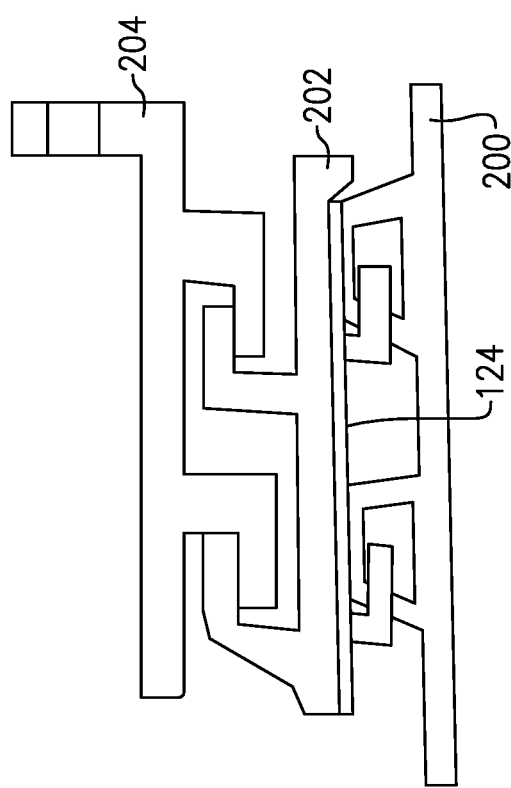

CERAMIC COMPONENT WITH SUPPORT STRUCTURE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Ceramics such as matrix composite ("CMC") materials are also being considered for use in various components of gas turbine engines. Among other attractive properties, CMCs have high temperature resistance and oxidation resistance. Despite these attributes, however, there are unique challenges to implementing CMCs in airfoils.

SUMMARY

An airfoil vane assembly according to an exemplary embodiment of this disclosure, among other possible things includes a vane piece having a first vane platform, a second vane platform, and a hollow airfoil section joining the first vane platform and the second vane platform, a spar piece having a spar platform and a spar extending from the spar platform into the hollow airfoil section, and at least one seal arranged at a sealing surface of the spar platform and sealing between the spar platform and the first vane platform. The airfoil vane assembly also includes a thermal barrier coating disposed on the spar piece. The sealing surface is free from the thermal barrier coating.

In a further example of the foregoing, the vane piece is a ceramic-based material.

In a further example of any of the foregoing, the ceramic-based material is a ceramic matrix composite.

In a further example of any of the foregoing, the spar piece is a metallic material.

In a further example of any of the foregoing, the airfoil vane assembly includes a clearance between an end of the thermal barrier coating and the sealing surface.

In a further example of any of the foregoing, the clearance is up to about 1 mil (0.0254 mm) long.

In a further example of any of the foregoing, the thermal barrier coating includes a taper at an end of the thermal barrier coating.

In a further example of any of the foregoing, the taper has a length that is up to about 100 mils (2.54 mm).

In a further example of any of the foregoing, the airfoil vane assembly includes a clearance between an end of the taper and the sealing surface.

In a further example of any of the foregoing, the thermal barrier coating has a thickness that is less than about 30 mils (0.762 mm).

In a further example of any of the foregoing, the thermal barrier coating has a thickness that is between about 3 mils (0.0762 mm) and about 15 mils (0.381 mm).

In a further example of any of the foregoing, the spar platform is a first spar platform. The airfoil vane assembly includes comprising a second spar platform such that the spar extends between the first and second platforms.

In a further example of any of the foregoing, the at least one seal is a first seal and the sealing surface is a first sealing surface. The airfoil assembly includes a second seal arranged at a second sealing surface of the second spar platform and sealing between the second spar platform and the second vane platform.

A gas turbine engine according to an exemplary embodiment of this disclosure, among other possible things includes a compressor section, a combustor in fluid communication with the compressor section, and a turbine section in fluid communication with the combustor. At least one of the turbine section and the compressor section includes an airfoil vane assembly. The airfoil vane assembly includes a vane piece having a first vane platform, a second vane platform, and a hollow airfoil section joining the first and second vane platforms, a spar piece having a first spar platform, a second spar platform, and a spar extending between the first and second spar platforms into the hollow airfoil section. A seal is arranged at a sealing surface of the first spar platform and sealing between the first spar platform and the first vane platform. A thermal barrier coating is disposed on the spar piece. The sealing surface is free from the thermal barrier coating.

In a further example of the foregoing, the seal is a first seal and the sealing surface is a first sealing surface. The gas turbine engine includes a second seal arranged at a second sealing surface of the second spar platform and sealing between the second spar platform and the second vane platform. The second sealing surface is free from the thermal barrier coating.

In a further example of any of the foregoing, there is a clearance between an end of the thermal barrier coating and the sealing surface.

In a further example of any of the foregoing, the thermal barrier coating includes a taper at an end of the thermal barrier coating.

In a further example of any of the foregoing, the thermal barrier coating has a thickness that is between about 3 mils (0.0762 mm) and about 15 mils (0.381 mm).

A method of making a spar piece for an airfoil vane assembly according to an exemplary embodiment of this disclosure, among other possible things includes applying a thermal barrier coating to a spar piece for an airfoil vane assembly. The spar piece includes at least one sealing surface configured to receive a seal for sealing between a platform of the spar piece and a platform of a vane piece, and the applying is such that the sealing surface is free from the thermal barrier coating.

In a further example of the foregoing, the method includes masking the sealing surface prior to the applying such that the thermal barrier coating is not deposited on the sealing surface.

BRIEF DESCRIPTION OF THE DRAWINGS

The various features and advantages of the present disclosure will become apparent to those skilled in the art from the following detailed description. The drawings that accompany the detailed description can be briefly described as follows.

FIGS. 2A-B illustrates an example vane for the example gas turbine engine of FIG. 1.

FIG. 2C illustrates a detail view of an example TBC for the example vane of FIG. 2A-B.

FIGS. 3A-B illustrate an example blade outer air seal for the example gas turbine engine of FIG. 1.

DETAILED DESCRIPTION

Figure 1:
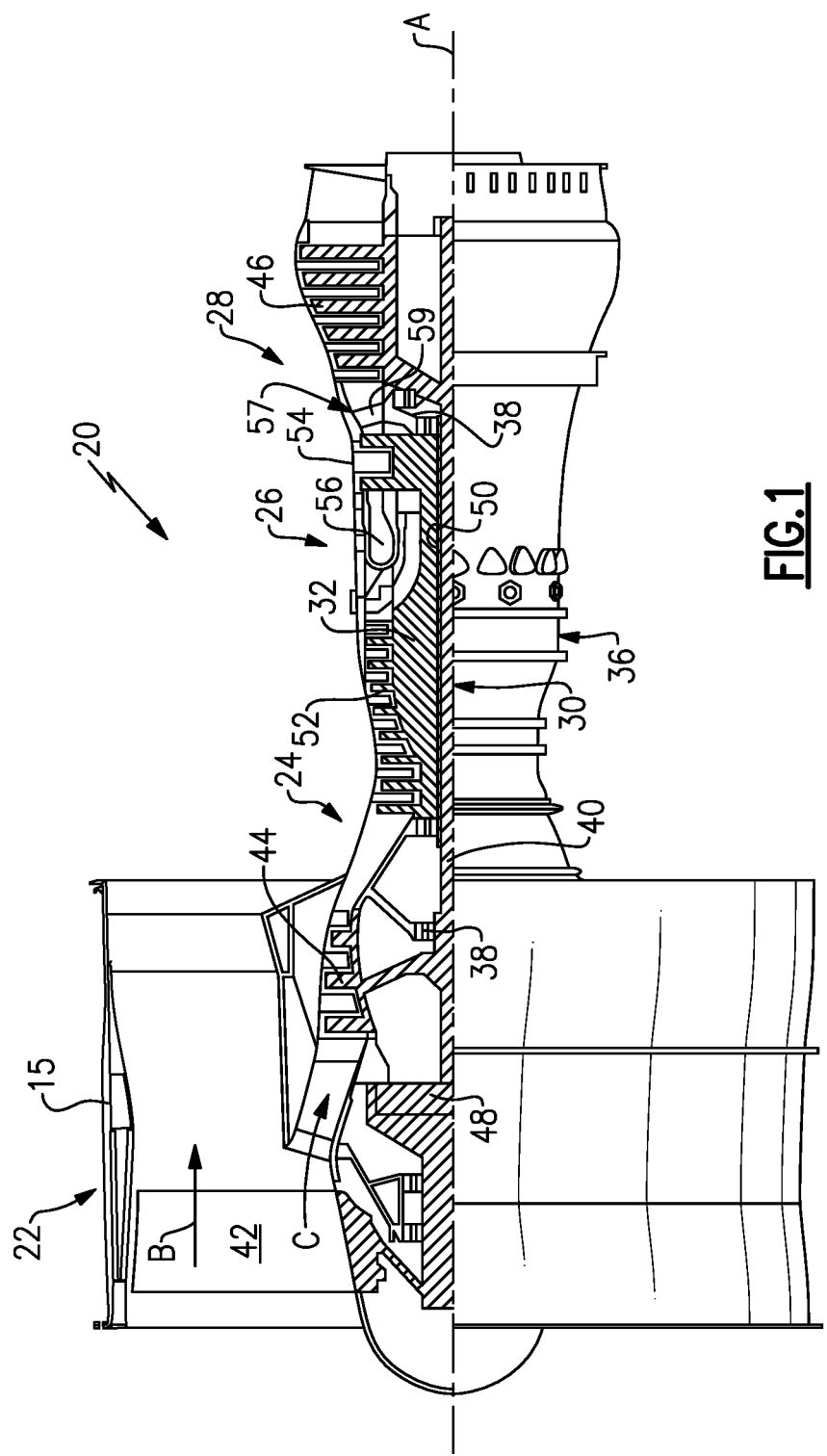
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Ceramic materials are of interest for use in various components of gas turbine engines 20 due to their high heat tolerance and good oxidation resistance. The ceramic may be a monolithic ceramic or a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. The CMC may be comprised of fiber plies that are arranged in a stacked configuration and formed to a desired geometry. For instance, the fiber plies may be layers or tapes that are laid-up one on top of the other to form the stacked configuration. The fiber plies may be woven or unidirectional, for example.

One example ceramic component for a gas turbine engine 20 is a vane. FIG. 2A illustrates a perspective view of a representative vane 100 from the turbine section 28 of the engine 20, although the examples herein may also be applied to vanes in the compressor section 24. FIG. 2B illustrates a sectioned view of the vane 100 along the section line shown in FIG. 2A. A plurality of vanes 100 are situated in a circumferential row about the engine central axis A (FIG. 1). The vane 100 is comprised of a vane piece 102 and a spar piece 104. The vane piece 102 includes several sections, including first (radially outer) and second (radially inner) platforms 106/108 and a hollow airfoil section 110 that joins the first and second platforms 106/108. The platforms 106/108 span between a leading edge LE and a trailing edge. The airfoil section 110 includes at least one internal passage 112. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

As noted above, the vane piece 102 may be a CMC material including fiber plies that are arranged in a stacked configuration and formed to the desired geometry of the vane piece 102. In one example, at least a portion of the fiber plies may be continuous through the first platform 106, the airfoil section 110, and the second platform 108. In this regard, the vane piece 102 may be continuous in that the fiber plies are uninterrupted through the first platform 106, the airfoil section 110, and the second platform 108. In alternate examples, the vane piece 102 may be discontinuous such that the first platform 106, the airfoil section 110, and/or the second platform 108 are individual sub-pieces that are attached to the other sections of the vane piece 102 in a joint.

The spar piece 104 defines a spar platform 114 and a (hollow) spar 116 that extends from the spar platform 114 into the hollow airfoil section 110. For example, the spar piece 104 is formed of a metallic material, such as a nickel- or cobalt-based superalloy, and is a single, monolithic piece. In some examples, the spar platform 114 is a first (radially outer) platform, and the spar piece 104 further includes a second (radially inner) platform 118. The spar piece 104 provides mechanical support to the vane piece 102. In some examples, the spar piece 104 may also act as a baffle to promote the flow of cooling air through the internal passage 112 of the vane piece 102.

With continued reference to FIG. 2B, one or more seals 120 are provided to seal off the internal passage 112. As noted above, the internal passage 112 receives cooling air flow F. The seals 120 maintain pressure of cooling air flow F within the internal passage 112 in order to maximize cooling effects of the cooling air flow F on the vane piece 102 and spar piece 104. The seals 120 could be any type of seal that is known in the art. In the example of FIG. 2B, there are four seals 120, one seal at each of the trailing edge TE and the leading edge LE of the interface between outer platform 106/spar platform 114 and inner platform 108/spar platform 118. More or less seals could be used in other examples. The seals 120 are arranged at sealing surfaces 122 of the platforms 114/118 and span to the platforms 106/108.

As noted above, ceramic-based components such as the vane piece 102 exhibit high temperature and oxidation resistance which can protect support structures such as the spar piece 104 from heat and oxidation. Additionally, because ceramic-based components have lower cooling requirements as compared to metallic components, a lower outflow margin (e.g., ratio of air pressure inside the component to air pressure outside the component) for cooling air can be used with ceramic components.

Moreover, the support structures such as the spar piece 104 are often metallic and therefore do not have the same inherent temperature and oxidation resistant properties. In the event of damage to ceramic-based components, the support structures could experience excessive heating because of the loss of heat protection from the ceramic-based component combined with the lower outflow margin employed for some ceramic-based components, as discussed above. In some examples, the support structures can carry cooling air to other parts of the engine 20, so damage to the ceramic-based components, and subsequent excessive heating of the support structures, could interfere with the flow of cooling air throughout the engine 20. In some extreme examples, the support structures could themselves become susceptible to damage from heat or oxidative effects.

Accordingly, the support structure includes a thermal barrier coating ("TBC"). The TBC improves the capability of the support structure to withstand high temperature environments as is known in the art, irrespective of the state or presence of the ceramic-based component. Moreover, even with the presence of an undamaged ceramic-based component, the TBC allows for use of even lower outflow margins because the additional heat protection provided by the TBC decreases the cooling requirements for the support structure. With a lower outflow margin, there is less risk of leakage across seals such as seals 120 since the air pressure within the ceramic component/support structure is decreased, leading to overall improved cooling efficiency within the engine 20.

With continued reference to FIG. 2B, the spar piece 104 includes a TBC 124. Various TBCs are known in the art, and any TBC 124 could be employed. In general, TBCs include a bond coat and at least one ceramic layer. Moreover, various methods of TBC application to a metallic component are known in the art, and any method of application could be used. In some examples, the TBC 124 has abrasion-resistance properties in addition to heat-resistance properties. The TBC 124 is disposed on at least the spar 116, but it can also extend along at least a portion of the spar platforms 114/118. However, the sealing surfaces 122 are free from TBC 124. Because the sealing surfaces 122 are free from TBC 124, the TBC 124 does not interfere with the sealing effectiveness of the seals 120.

In some examples, a clearance L is provided between the end of the TBC 124 and the seal 120. The clearance L can be up to about 1 mil (0.0254 inches) long. For example, prior to application of the TBC 124 to the spar piece 104, the sealing surface 122 and desired clearance L could be masked off to prevent deposition of TBC 124 in the sealing surface 122 and/or clearance L. Masking is a well-known procedure that is compatible with various coating deposition methods such as air plasma spraying or others.

In another example, shown in FIG. 2C, the TBC 124 includes a taper 126 at the end of the TBC 124 as the TBC 124 approaches the seal 120. In this example, the length T of the taper can be up to about 100 mils (2.54 mm). The clearance L can optionally be employed together with the taper 126.

In some examples, the TBC 124 has a thickness that is less than about 50 mils (1.27 mm). In a further example, the TBC 124 has a thickness that is less than about 30 mils (0.762 mm). In a further example, the TBC 124 has a thickness that is between about 3 mils (0.0762 mm) and about 15 mils (0.381 mm). In general, the TBC 124 does not substantially change the size of the spar piece 104 and does not substantially decrease the size of the clearance between the spar 116 and the airfoil section 110.

FIGS. 3A-B illustrate example blade outer air seals (BOAS). Like vanes 100, BOAS can also employ ceramic-based components with metallic support structures. Accordingly, BOAS can also benefit from the TBC as discussed above. In the example of FIG. 3A, a ceramic-based BOAS 200 is supported on a metallic carrier 202. The ceramic-based BOAS 200 could be a monolithic ceramic material or a CMC material, as discussed above. The carrier 202 is in turn connected to a casing structure 204 of the engine 20. The carrier 202 includes a TBC 124 on its radially inner side (e.g., the side adjacent the BOAS 200). In this example, a clearance L can be provided between the TBC 124 and BOAS 200. Alternatively or additionally, the TBC 124 can have abrasion-resistant properties, as discussed above.

In the example of FIG. 3B, a ceramic-based BOAS 300 is supported on supports 302 of a casing structure 304 of the engine 20 by a connector 306. The ceramic-based BOAS 300 could be a monolithic ceramic material or a CMC material, as discussed above. In this example, the casing structure 304 includes TBC 124; however, interfaces 308 of the supports 302/connector 306 are free of TBC 124 much like sealing surfaces 122 in the example of FIG. 2B are free from TBC 124. The same clearance L discussed above can be employed in this example between end of the TBC 124 and the interfaces 306. Alternatively or additionally, a taper 126 as shown above in FIG. 2C.

In the examples of FIGS. 3A-C, the TBC 124 can have a thickness that is less than about 50 mils (1.27 mm). In a further example, the TBC 124 has a thickness that is less than about 30 mils (0.762 mm). In a further example, the TBC 124 has a thickness that is between about 20 mils (0.508 mm) and about 30 mils (0.762 mm).

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil vane assembly, comprising:
a vane piece having a first vane platform, a second vane platform, and a hollow airfoil section joining the first vane platform and the second vane platform;
a spar piece having a spar platform having an extent defined between a leading edge and a trailing edge and a spar extending from the spar platform into the hollow airfoil section;
at least one seal arranged at a sealing surface of the spar platform and sealing between the spar platform and the first vane platform; and
a thermal barrier coating disposed on the spar and substantially the extent of the spar platform of the spar piece except for the sealing surface, wherein the sealing surface is free from the thermal barrier coating.

2. The airfoil vane assembly of claim 1, wherein the vane piece is a ceramic-based material.

3. The airfoil vane assembly of claim 2, wherein the ceramic-based material is a ceramic matrix composite.

4. The airfoil vane assembly of claim 1, wherein the spar piece is a metallic material.

5. The airfoil vane assembly of claim 1, further comprising a clearance between an end of the thermal barrier coating and the sealing surface.

6. The airfoil vane assembly of claim 5, wherein the clearance is up to about 1 mil (0.0254 mm) long.

7. The airfoil vane assembly of claim 1, wherein the thermal barrier coating includes a taper at an end of the thermal barrier coating.

8. The airfoil vane assembly of claim 7, wherein the taper has a length that is up to about 100 mils (2.54 mm).

9. The airfoil vane assembly of claim 7, further comprising a clearance between an end of the taper and the sealing surface.

10. The airfoil vane assembly of claim 1, wherein the thermal barrier coating has a thickness that is less than about 30 mils (0.762 mm).

11. The airfoil vane assembly of claim 10, wherein the thermal barrier coating has a thickness that is between about 3 mils (0.0762 mm) and about 15 mils (0.381 mm).

12. The airfoil vane assembly of claim 1, wherein the spar platform is a first spar platform, and further comprising a second spar platform such that the spar extends between the first and second spar platforms.

13. The airfoil assembly of claim 12, wherein the at least one seal is a first seal and the sealing surface is a first sealing surface, and further comprising a second seal arranged at a second sealing surface of the second spar platform and sealing between the second spar platform and the second vane platform.

14. A gas turbine engine, comprising:
a compressor section;
a combustor in fluid communication with the compressor section; and
a turbine section in fluid communication with the combustor, wherein at least one of the turbine section and the compressor section includes an airfoil vane assembly, the airfoil vane assembly including:
a vane piece having a first vane platform, a second vane platform, and a hollow airfoil section joining the first and second vane platforms;
a spar piece having a first spar platform, a second spar platform having an extent defined between a leading edge and a trailing edge, and a spar extending between the first and second spar platforms into the hollow airfoil section;
a seal arranged at a sealing surface of the first spar platform and sealing between the first spar platform and the first vane platform; and
a thermal barrier coating disposed on the spar and substantially the extent of the spar platform of the spar piece except for the sealing surface, wherein the sealing surface is free from the thermal barrier coating.

15. The gas turbine engine of claim 14, wherein the seal is a first seal and the sealing surface is a first sealing surface, and further comprising a second seal arranged at a second sealing surface of the second spar platform and sealing between the second spar platform and the second vane platform, wherein the second sealing surface is free from the thermal barrier coating.

16. The gas turbine engine of claim 14, further comprising a clearance between an end of the thermal barrier coating and the sealing surface.

17. The gas turbine engine of claim 14, wherein the thermal barrier coating includes a taper at an end of the thermal barrier coating.

18. The gas turbine engine of claim 14, wherein the thermal barrier coating has a thickness that is between about 3 mils (0.0762 mm) and about 15 mils (0.381 mm).

19. A method of making a spar piece for an airfoil vane assembly, comprising:
applying a thermal barrier coating to a spar and spar platform of the spar piece for an airfoil vane assembly, wherein the spar piece includes at least one sealing surface configured to receive a seal for sealing between a platform of the spar piece and a platform of a vane piece, wherein the thermal barrier coating is disposed on substantially the extent of the spar platform except for the sealing surface, such that the sealing surface is free from the thermal barrier coating, and wherein the extent of the spar platform is defined between a leading edge and a trailing edge.

20. The method of claim 19, further comprising masking the sealing surface prior to the applying such that the thermal barrier coating is not deposited on the sealing surface.

* * * * *